US008783044B2

(12) United States Patent
Steiger et al.

(10) Patent No.: US 8,783,044 B2
(45) Date of Patent: Jul. 22, 2014

(54) TURBINE STATOR NOZZLE COOLING STRUCTURE

(75) Inventors: Ulrich Steiger, Baden-Dattwil (CH); Jonas Hurter, Baden (CH)

(73) Assignee: Alstom Technology Ltd, Baden (CH)

( * ) Notice: Subject to any disclaimer, the term of this patent is extended or adjusted under 35 U.S.C. 154(b) by 167 days.

(21) Appl. No.: 12/824,630

(22) Filed: Jun. 28, 2010

(65) Prior Publication Data

US 2010/0313571 A1 Dec. 16, 2010

Related U.S. Application Data

(63) Continuation of application No. PCT/EP2008/067739, filed on Dec. 17, 2008.

(30) Foreign Application Priority Data

Dec. 29, 2007 (CH) ...................................... 0023/08

(51) Int. Cl.
*F02C 7/12* (2006.01)
*F01D 5/14* (2006.01)
*F01D 5/18* (2006.01)
*F01D 9/02* (2006.01)

(52) U.S. Cl.
CPC ........... *F01D 5/186* (2013.01); *F05B 2240/801* (2013.01); *F01D 9/023* (2013.01)
USPC ............................................ 60/806; 415/115

(58) Field of Classification Search
USPC .......... 60/805, 806, 752–760, 39.15; 415/115
See application file for complete search history.

(56) References Cited

U.S. PATENT DOCUMENTS 3,304,713 A * 2/1967 Szydlowski .................... 60/745
3,608,310 A * 9/1971 Vaught ............................ 60/752
3,959,966 A * 6/1976 Pearce et al. .................... 60/796
3,965,066 A * 6/1976 Sterman et al. ................. 60/800

(Continued)

FOREIGN PATENT DOCUMENTS

DE 1199541 B 8/1965
DE 19813779 A1 9/1999

(Continued)

OTHER PUBLICATIONS

Joos, Dr. Franz et al. "Field experience with the sequential combustion system of the GT24/GT26 gas turbine family" ABB Review May 1998, pp. 12-20.

*Primary Examiner* — Gerald L Sung
(74) *Attorney, Agent, or Firm* — Buchanan Ingersoll & Rooney PC

(57) ABSTRACT

In a gas turbine, a plurality of burners, which are arranged concentrically to the rotational axis in a regular arrangement, each directing hot gas through an associated combustion chamber outlet into a turbine, at the inlet of which a second plurality of stator blades are arranged in a ring, uniformly spaced apart around the rotational axis. Cooling openings are provided, which are distributed over the circumference, through which cooling air is injected into the hot gas flow at the combustion chamber outlet. An improvement of the flow conditions in the hot gas is achieved by the cooling openings being divided into first cooling opening groups and second cooling opening groups. The arrangement of the first cooling opening groups corresponds to the arrangement of the stator blades, and in that the arrangement of the second cooling opening groups corresponds to the regular arrangement of the burners.

14 Claims, 1 Drawing Sheet

(56) References Cited

U.S. PATENT DOCUMENTS

| | | | | |
|---|---|---|---|---|
| 3,990,837 | A * | 11/1976 | Snell | 60/752 |
| 4,012,167 | A * | 3/1977 | Noble | 416/97 A |
| 4,026,659 | A * | 5/1977 | Freeman, Jr. | 415/115 |
| 4,126,405 | A * | 11/1978 | Bobo et al. | 415/115 |
| 4,733,538 | A | 3/1988 | Vdoviak et al. | |
| 4,739,621 | A * | 4/1988 | Pettengill et al. | 60/757 |
| 4,821,522 | A * | 4/1989 | Matthews et al. | 60/757 |
| 4,932,861 | A | 6/1990 | Keller et al. | |
| 5,167,485 | A * | 12/1992 | Starkweather | 415/115 |
| 5,407,319 | A * | 4/1995 | Harrogate et al. | 415/115 |
| 5,417,545 | A * | 5/1995 | Harrogate | 415/115 |
| 5,470,198 | A * | 11/1995 | Harrogate et al. | 415/115 |
| 5,588,826 | A | 12/1996 | Dobbeling et al. | |
| 6,082,961 | A | 7/2000 | Anderson et al. | |
| 6,751,962 | B1 | 6/2004 | Kuwabara et al. | |
| 6,758,651 | B2 * | 7/2004 | Tomita et al. | 415/115 |
| 6,830,427 | B2 * | 12/2004 | Lafarge et al. | 415/115 |
| 7,004,720 | B2 * | 2/2006 | Synnott et al. | 415/115 |
| 7,040,097 | B2 | 5/2006 | Mukherjee | |
| 7,234,304 | B2 * | 6/2007 | Alkabie | 60/725 |
| 7,806,650 | B2 * | 10/2010 | Heyward et al. | 415/115 |
| 7,857,580 | B1 * | 12/2010 | Liang | 415/115 |
| 2002/0148214 | A1 * | 10/2002 | Tiemann | 60/39.17 |
| 2005/0172634 | A1 * | 8/2005 | Mukherjee | 60/775 |
| 2006/0078417 | A1 * | 4/2006 | Benton | 415/115 |
| 2009/0013530 | A1 * | 1/2009 | Rudrapatna et al. | 29/888 |
| 2009/0123267 | A1 * | 5/2009 | Zhang et al. | 415/115 |

FOREIGN PATENT DOCUMENTS

| | | | |
|---|---|---|---|
| EP | 0321809 | A1 | 6/1989 |
| EP | 0615055 | A1 | 9/1994 |
| EP | 0704657 | A2 | 4/1996 |
| EP | 0902164 | A1 | 3/1999 |
| EP | 1505254 | A2 | 2/2005 |
| GB | 980363 | | 1/1965 |

* cited by examiner

TURBINE STATOR NOZZLE COOLING STRUCTURE

CROSS REFERENCE TO RELATED APPLICATION

This application is a continuation of International Application No. PCT/EP2008/067739 filed Dec. 17, 2008, which claims priority to Swiss Patent Application No. 00023/08, filed Dec. 29, 2007, the entire contents of all of which are incorporated by reference as if fully set forth.

FIELD OF INVENTION

The present invention relates to the field of gas turbine technology.

BACKGROUND

Gas turbines in their stationary form have had their permanent place in power generation for a long time. In this case, it concerns high performance machines, the efficiency of which is constantly being further improved. An example of the stage of development which has been achieved are the type GT24/26 gas turbines of the Assignee of the present application, which are equipped with 2-stage sequential combustion, and which are described for example in the article by F. Joos et al., “Field experience with the sequential combustion system of the GT24/GT26 gas turbine family”, ABB review 5, p. 12-20 (1998). Inducted air is compressed in a compressor and fed to a first burner arrangement where it is used for the combustion of an injected fuel. This first burner arrangement comprises premix burners which among specialists have also been known as EV burners or possibly AEV burners. Such burners follow for example from EP-0321809 A1 and EP-0704657 A1 respectively, wherein these printed publications and also further publications which are related to this technology form an integrating element of this application. The hot gas which is created as a result of this combustion is first of all partially expanded in a high-pressure turbine and then introduced into a second burner arrangement (known among specialists as SEV burners), where the portion of unused air is used for a second combustion. The hot gas from the SEV burners is then expanded in a low-pressure turbine. The exhaust gases are then finally used for example for steam generation in a heat recovery steam generator.

On the outlet side of the SEV burner, the hot gas flow impinges upon the first row of stator blades of the low-pressure turbine. This configuration is described for example in U.S. Pat. No. 6,751,962 or in EP-A2-1 505 254, the contents of which are incorporated by reference as if fully set forth, and is reproduced in a detail in FIG. 1 of the present description. In the gas turbine 10 of FIG. 1, the hot gas 12, which discharges from the combustion chamber outlet 11, impinges upon the leading edge of the stator blades 15 of the first stator blade ring which is arranged at the inlet of the turbine. The combustion chamber outlet 11 is bounded at the side by means of a delimiting element 19. Between the end of the delimiting element 19 and the first stator blade row 15 there is a gap 16 which is sealed to the outside by means of an annular seal 17. By means of purging openings 18 in the seal 17 and leakages, purging air enters the gap 16 and prevents ingress of hot gas. Cooling air is also injected through cooling openings 20, 21 in the delimiting element, as is described in the aforementioned U.S. Pat. No. 6,751,962.

As a result of the fast flowing hot gas, various effects occur at the transition to the turbine. For one thing, a rearwards directed bow wave 13 is created at the leading edge of the stator blades 15, which is superimposed upon the pressure drops from the suction side 24*a*, 24*b*, 24*c*, 24*d* to the pressure side 25*a*, 25*b*, 25*c*, 25*d*. On the other hand, as a result of the complex flow conditions in the burners or combustion chambers with swirl elements which in most cases exist therein, a characteristic pressure distribution is created at the combustion chamber outlet 11, which can be referred to as a burner wave 14.

The unequal distribution of pressure at the combustion chamber outlet 11 in practice can be of the same order of magnitude as the pressure changes which ensue as a result of the bow wave 13 on the stator blades 15. The superimposition of the two effects (bow wave 13 and burner wave 14) can therefore lead to a situation in which the amplitude of the bow wave is effectively doubled and so hot gas escapes from the hot gas passage. These flow conditions, both in gas turbines with one combustion chamber or in gas turbines with sequential combustion, that is to say via 2 combustion chambers (EV, or AEV, and SEV), occur in each case at the transition from the burners to the turbine.

SUMMARY

The present disclosure is directed to a gas turbine including a plurality of burners, which are arranged concentrically to a rotational axis in a regular arrangement, in each case direct hot gas through an associated combustion chamber outlet into a turbine. At an inlet of which a plurality of stator blades are arranged in a ring, being uniformly spaced apart around the rotational axis. Cooling openings are also provided which are distributed over the circumference and through which cooling air can be injected into the hot gas flow at the combustion chamber outlet. The cooling openings, with regard to the passage which is formed by the hot gas flow, are arranged in the region of an inner encompassing and/or outer encompassing gap and are divided into first cooling opening groups and/or second cooling opening groups. The arrangement of the first cooling opening groups corresponds to the arrangement of the stator blades, and the arrangement of the second cooling opening groups corresponds to the regular arrangement of the burners.

The disclosure is also directed to a method for operating a gas turbine having a plurality of burners, which are arranged concentrically to a rotational axis in a regular arrangement. The burners have a corresponding combustion chamber outlet via which hot gas is injected into a turbine. At an inlet of the turbine a plurality of stator blades are operated and arranged in a ring, uniformly spaced apart around the rotational axis, and in which gas turbine cooling openings take effect, and are distributed over the circumference and through which cooling air is injected into the hot gas flow. The method includes providing at least one inner encompassing gap in the region of the stator blades, or upstream of the stator blades, The method also includes orienting outer encompassing cooling openings which operate towards the hot gas flow. The cooling openings are divided into first cooling opening groups and second cooling opening groups, the arrangement of the first cooling opening groups corresponds to the arrangement of the stator blades and the arrangement of the second cooling opening groups corresponds to the regular arrangement of the burners.

BRIEF DESCRIPTION OF THE DRAWINGS

The invention shall subsequently be explained in more detail based on exemplary embodiments in conjunction with the drawing. All elements which are not necessary for the direct understanding of the invention are omitted. The flow direction of the different media are indicated by arrows. Like elements in the different figures are provided with the same designations. In the drawings.

DETAILED DESCRIPTION OF THE PREFERRED EMBODIMENTS

Introduction to the Embodiments

It is an object of the invention to provide a gas turbine in which the unfavorable effects of the bow wave and of the burner wave at the transition between combustion chamber outlet and turbine inlet are avoided.

The object is achieved by the features set forth in the appended claims. It is preferable for the discovered solution that the cooling openings are divided into first cooling opening groups and second cooling opening groups, that the arrangement of the first cooling opening groups corresponds to the arrangement of the stator blades, and that the arrangement of the second cooling opening groups corresponds to the regular arrangement of the burners.

This solution is based therefore on the following considerations:

- The flows at the combustion chamber outlet are unequal on account of the configuration of the burners with their flow vortices, local effects of wall cooling, and leakage air.
- An unequal distribution of the purging and leakage air in the gap between combustion chamber outlet and turbine inlet results from this.
- If the cooling openings are arranged at the places where the highest pressure occurs in the flow, these effects can be compensated.

The invention refers to the interface of burners and turbine in gas turbines with 1 or 2 burner arrangements or combustion chambers.

The number of burners which are especially used in the said combustion chambers is often disparate to the number of stator blades, especially being fewer than the number of stator blades.

According to another development of the invention, the burners are arranged in the second stage of a gas turbine with two-stage or sequential combustion.

In a further development, the cooling openings of the first cooling opening groups have a non-defined position with regard to the leading edges of the stator blades, typically slightly on the pressure side of the leading edge, and the cooling openings of the second cooling opening groups are oriented transversely to the hot gas flow.

In an especially preferred development of the invention, an encompassing gap is provided between the combustion chamber outlets and the first stator blade row of the turbine, which is purged with purging air through purging openings which are arranged in a distributed manner on the circumference, the purging openings are divided into groups, the arrangement of which corresponds to the arrangement of the stator blades and/or to the regular arrangement of the burners.

Additional advantageous and expedient developments of the solution to the above problems are likewise found in the appended claims.

DETAILED DESCRIPTION

Figure 2:
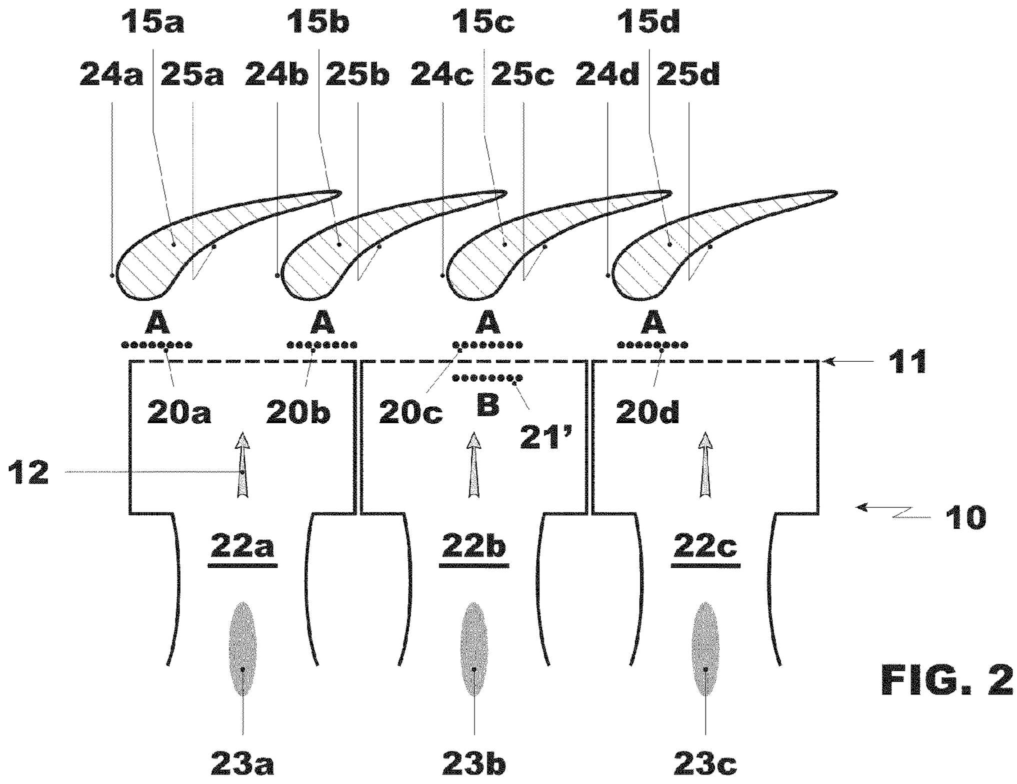
FIG. 2 shows in a schematic view the different periodicity of stator blades and burners, according to which the arrangement of the cooling opening groups is oriented according to the invention.

In FIG. 2, in a schematic view, the different periodicity of stator blades 15_a, b, c, d_ and burners 22_a, b, c_ is reproduced, according to which the arrangement of cooling openings 18, 20 and 21 is oriented according to the invention.

Figure 1:
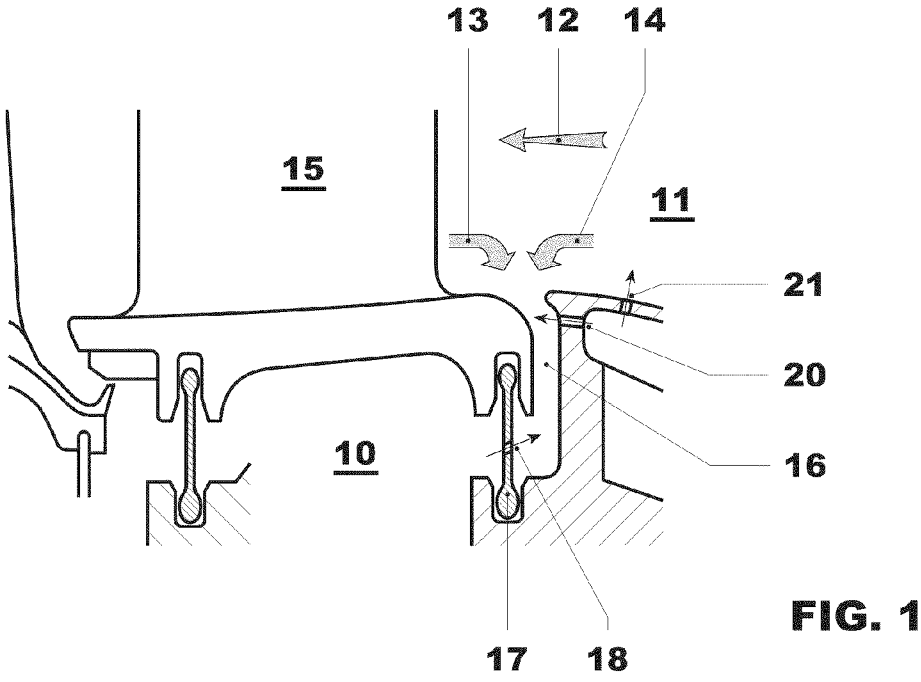
FIG. 1 shows in a detail a transition between the combustion chamber outlets and the first stator blade row of a gas turbine, as is suitable for realization of the invention.

For this, as follows from FIG. 2, the cooling openings 20 according to FIG. 1, which are oriented towards the stator blades 15, are divided into cooling opening groups 20_a, b, c_ and _d_, which form a cooling opening row A which is distributed over the circumference. Furthermore, as is easily seen in FIG. 2, a cooling opening group 20_a, b, c, d_ is associated with each stator blade 15_a, b, c, d_, wherein the periodicity of the cooling opening groups 20_a, b, c, d_ is equal to the periodicity of the stator blades 15_a, b, c, d_. In particular, the cooling opening groups 20_a, b, c, d_ are associated with the leading edges of the stator blades 15_a, b, c, d_, along which the bow wave 13 is created, as is shown in FIG. 1. The cooling openings are typically arranged slightly on the pressure side of the leading edges in order to also compensate the pressure difference from pressure to suction side.

The cooling openings 21, which inject cooling air transversely into the combustion chamber outlet 11, are also combined to form cooling opening groups, of which only the one cooling opening group 21' is shown in FIG. 2 and one cooling opening row B is indicated. The periodicity of the cooling openings 21' is equal to the periodicity of the burners 22_a, b, c_. In the example of FIG. 2, the cooling opening groups 21' are arranged directly in the middle of the combustion chamber outlets and are therefore oriented towards the burner lances 23_a, b_ which lie in the middle. Other arrangements of equal periodicity are conceivable and oriented according to the concrete flow conditions at the combustion chamber outlet.

Depending upon flow conditions, the cooling air openings 20, 21 can be provided not only cumulatively but can also be used alternatively to each other, or can be arranged in an alternating manner. The same considerations, cumulative, alternative or alternating, also apply with regard to the purging openings 18.

As a result of the orientation of the two cooling opening groups 20_a, b, c, d_ and 21' in the cooling opening rows A and B towards the stator blades 15_a, b, c, d_ or towards the burners 22_a, b, c_, the increasing, undesirable effects of the bow waves 13 and burner waves 12 can be weakened or rendered harmless in a simple manner.

An additional possibility of influencing is created if comparable periodicities of opening groups, which can be selectively oriented according to the periodicity of the stator blades 15_a, b, c, d_ or of the burners 22_a, b, c_, or of both, are introduced for the purging openings 18 which are associated with the gap 16. As a result of this, unequal distributions in the gap region, which result from the superimposition of bow waves 13 and burner waves 12, can be directly compensated.

Finally, a type of construction which is not shown in more detail in the described figures is briefly commented upon. With regard to FIG. 1, constructions inside the hot gas flow passage are possible in which there is not only an inner encompassing gap 16 in the circumferential direction but there is also an outer encompassing gap on the outer encompassing side of this hot gas flow passage, which largely fulfills the same attributes. In such a case, provision is also made in the region of this outer encompassing gap for first and/or second cooling opening groups (20, 21) which fulfill the same final purpose as in the region of the gap 16 which is shown.

List of Designations

10 Gas turbine
11 Combustion chamber outlet
12 Hot gas
13 Bow wave (stator blade)
14 Burner wave
15; 15*a,b,c,d* Stator blade
16 Gap (encompassing)
17 Seal (annular)
18 Purging opening
19 Delimiting element
20; Cooling opening
20*a,b,c,d* Cooling opening group
21 Cooling opening
21' Cooling opening group
22*a,b,c* Burner
23*a,b* Burner lance
24*a,b,c,d* Suction side of the stator blade
25*a,b,c,d* Pressure side of the stator blade

What is claimed is:

1. A gas turbine, comprising a plurality of burners, arranged concentrically to a rotational axis in a regular arrangement, each burner directing hot gas through an associated combustion chamber outlet into a turbine, a plurality of stator blades are arranged in a ring, at an inlet of the turbine, uniformly spaced apart around the rotational axis, the gas turbine comprises cooling openings which are distributed over the circumference and through which cooling air can be injected into the hot gas flow at the combustion chamber outlet, the cooling openings, with regard to the passage which is formed by the hot gas flow, are arranged in the region of an inner encompassing gap and are divided into first cooling opening groups and second cooling opening groups, wherein the periodicity of the first cooling opening groups is equal to the periodicity of the stator blades, and each of the first cooling opening groups has a same number of cooling openings, wherein the periodicity of the second cooling opening groups is equal to the periodicity of the burners, and wherein the cooling openings of the first cooling opening groups are unevenly distributed across the plurality of burners to reduce effects of a bow wave.

2. The gas turbine as claimed in claim 1, wherein the inner encompassing gap is located in the region of, or upstream of, the stator blades.

3. The gas turbine as claimed in claim 1, wherein the burners are uniformly spaced apart.

4. The gas turbine as claimed in claim 1, wherein the number of burners is disparate to the number of stator blades.

5. The gas turbine as claimed in claim 4, wherein the number of burners is fewer than the number of stator blades.

6. The gas turbine as claimed in claim 1, wherein the burners are arranged in the second stage of a gas turbine with two-stage or sequential combustion.

7. The gas turbine as claimed in claim 1, wherein the cooling openings of the first cooling opening groups are oriented towards the leading edges of the stator blades, and the cooling openings of the second cooling opening groups are oriented transversely to the hot gas flow.

8. The gas turbine as claimed in claim 1, wherein the inner encompassing gap between the combustion chamber outlets and a first stator blade row of the turbine, the gap being purged with purging air through purging openings which are arranged in a distributed manner on the circumference, the purging openings are divided into groups, the arrangement of which corresponds to the arrangement of the stator blades and/or to the regular arrangement of the burners.

9. The gas turbine as claimed claim 8, wherein the purging openings are arranged increasingly, alternatively or in an alternating manner in relation to the cooling openings.

10. The gas turbine as claimed in claim 1, wherein a distance between the first cooling opening groups is larger than a distance between adjacent cooling openings in the first cooling opening groups.

11. The gas turbine as claimed in claim 1, wherein each of the first cooling groups is located across from a leading edge of a stator blade.

12. The gas turbine as claimed in claim 1, wherein more cooling openings of the first cooling opening group are located across a pressure side of the stator blade than across from a suction side of the stator blade.

13. The gas turbine as claimed in claim 1, wherein the cooling openings of the first cooling opening groups are concentrated at positions across from the plurality of stator blades.

14. A method for operating a gas turbine having a plurality of burners, arranged concentrically to a rotational axis in a regular arrangement, the burners having a corresponding combustion chamber outlet via which hot gas is injected into a turbine, a plurality of stator blades are operated and arranged in a ring, uniformly spaced apart around the rotational axis at an inlet of the turbine, said gas turbine comprises cooling openings, which operate, and are distributed over the circumference and through which cooling air is injected into the hot gas flow, the method comprising:

providing at least one inner encompassing gap in the region of the stator blades, or upstream of the stator blades, orienting outer encompassing cooling openings, which operate towards the hot gas flow, dividing the cooling openings into first cooling opening groups and second cooling opening groups, the periodicity of the first cooling opening groups corresponds to the periodicity of the stator blades, each of the first cooling opening groups has a same number of cooling openings, the periodicity of the second cooling opening groups corresponds to the periodicity of the burners, and the cooling openings of the first cooling opening groups are unevenly distributed across the plurality of burners to reduce effects of a bow wave.

* * * * *